Oct. 24, 1950     D. P. COOPER, JR     2,527,400
MELAMINE-FORMALDEHYDE-SURFACED CELLULOSE
DERIVATIVE LAMINATION FOR POLARIZERS
Filed July 16, 1947
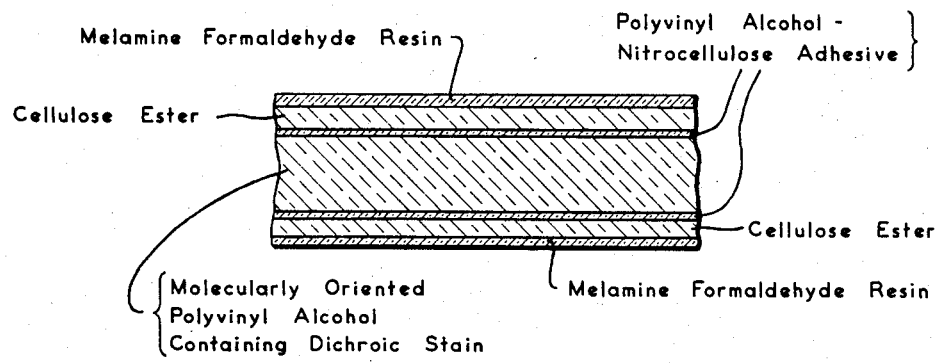
INVENTOR
Dexter P. Cooper, Jr.
BY
Donald L. Brown
ATTORNEY Patented Oct. 24, 1950

2,527,400

UNITED STATES PATENT OFFICE 2,527,400

MELAMINE - FORMALDEHYDE - SURFACED CELLULOSE DERIVATIVE LAMINATION FOR POLARIZERS

Dexter P. Cooper, Jr., Cambridge, Mass., assignor to Polaroid Corporation, Cambridge, Mass., a corporation of Delaware Application July 16, 1947, Serial No. 761,419

3 Claims. (Cl. 88—65)

This invention relates to plastics and more particularly to plastic laminations of improved characteristics for optical purposes.

An object of this invention is to provide a transparent plastic lamination having improved surface characteristics with respect to hardness, scratch-resistance and optical uniformity. Other objects will be apparent to those skilled in the art from the disclosures herein made.

For a fuller understanding of the nature and objects of the invention, reference should be had to the accompanying drawing, which is a partial view in vertical section showing a lamination embodying a form of the invention.

By this invention there is provided a press-polished sheet plastic lamination, one or both surfaces of which are formed by a thin layer or layers of melamine-formaldehyde thermoset resin, and the body portion of which comprises essentially a thermoplastic cellulose derivative of the class consisting of cellulose nitrate, cellulose acetate, cellulose acetate proprionate, cellulose acetate butyrate and ethyl cellulose. The melamine-formaldehyde surface layer conveniently may be about 0.0005 inch thick, and in ordinary practice may range from about 0.0001 inch to about 0.001 inch in thickness. In certain instances the surface layer may be several thousandths of an inch in thickness. The thermoplastic cellulose derivative body portion has a minimum thickness of about 0.005 inch, with no upper limit as to the thickness thereof. Where the cellulose derivative constituting the body portion is one which normally does not adhere tightly to melamine-formaldehyde, an interlayer or subcoating, such as of cellulose nitrate, may be interposed between the melamine-formaldehyde and the cellulose derivative body portion. The lamination may include a polarizing sheet, such for example as that disclosed in Land Patent Number 2,237,567, namely, molecularly oriented polyvinyl alcohol stained with iodine.

Transparent plastic laminations which may be made according to this invention exhibit a uniform surface optically characteristic of plate glass, together with great surface hardness and high scratch-resistance, thus rendering the plastic laminations suitable for purposes for which hitherto only optical glass has had the requisite properties. Not only do the transparent plastic laminations of this invention have improved optical and mechanical properties, but they may be prepared readily and inexpensively.

Laminations according to this invention involve novel and surprising features. Thus melamine-formaldehyde is non-thermoplastic, and normally is brittle as well as hard. Cellulose derivative sheets, of course, are soft and readily scratched. When, however, a lamina of melamine-formaldehyde is secured to a cellulose derivative lamina, both of dimensions herein disclosed, and the assemblage press-polished, the surprising result obtains that the melamine-formaldehyde conforms to the contour of the press-polishing member and the cellulose derivative thermoplastically becomes permanently deformed so as to maintain the surface of the melamine-formaldehyde in the acquired contour.

The invention conveniently may be illustrated by the preparation of a specific polarizing sheet suitable for sun glasses and the like. For the production of such polarizing sheet, there will first be described the preparation of a cellulose acetate butyrate sheet with a melamine-formaldehyde coating. Thus, cellulose nitrate lacquer is applied by the well-known roll-coating technique to a cellulose acetate butyrate transparent plastic sheet of about 0.010 inch thickness, and the cellulose nitrate composition is dried. The roll-coating conditions are suitably arranged so that there is deposited on one side of the cellulose acetate butyrate a dried cellulose nitrate coating about 0.003 millimeter thick. The object of the cellulose nitrate coating is to insure adhesion of the later-applied melamine-formaldehyde.

By the roll-coating technique there is then applied over the cellulose nitrate a coating of melamine-formaldehyde. For this purpose a melamine-formaldehyde material is employed which contains about 10% of alkyd resin modifier. A suitable commercial form of alkyd-modified melamine-formaldehyde is that known as "Uformite MU56," manufactured by Resinous Products and Chemical Company. The coating composition comprises a solution of the melamine-formaldehyde material dissolved in a solvent consisting of ethylene dichloride and methanol. As a catalyst for the condensation reaction there is incorporated in the solution about 0.03% of phosphoric acid based on the quantity of melamine-formaldehyde present. Following the application of the coating composition, it is permitted to dry. Then the coated sheet is heated in the presence of air to a temperature of 120° C. for about thirty minutes. By this heating, the condensation reaction between the melamine and formaldehyde is caused to go to completion, to produce the thermoset resin. Furthermore, by heating in the presence of air, water produced by the condensation reaction does not cause haze in the transparent plastic sheet. The roll-coating technique is so arranged that the thickness of the melamine-formaldehyde coating is about 0.0005 inch thick.

A plastic polarizing sheet is provided comprising a sheet of polyvinyl alcohol having its molecules oriented to substantial parallelism and having incorporated therein a dichroic iodine stain. Such a polarizing sheet is disclosed in Land Patent 2,237,567.

A lamination is produced by adhesively securing together a polyvinyl alcohol polarizing sheet as just described between two melamine-formaldehyde-coated cellulose acetate butyrate sheets as hereinbefore described with the melamine-formaldehyde surfaces exteriorly disposed. These laminae are secured together by adhesive consisting essentially of polyvinyl alcohol and cellulose nitrate.

To obtain the optical-quality product of this invention, the lamination produced as described hereinabove is press-polished between plate-glass surfaces. A conventional press-polishing press with heated platens is suitable. Thus, the lamination to be press-polished is placed between plate-glass sheets of about ½ inch thickness and which are already heated to 80° C., and the assemblage is placed in a conventional press. Heat is applied to the platens of the press at such a rate that in ten minutes the plate glass is raised to a temperature of 120° C. The pressure applied to the platens of the press is 500 pounds per square inch. When the temperature reaches 120° C., the heat is reduced at such a rate that the plate glass reaches a temperature of 80° C. in ten minutes, whereupon the press-polished lamination is removed. The press-polishing cycle above described requires twenty minutes.

The press-polished lamination prepared as above described exhibits surfaces of plate-glass optical character together with great hardness and high scratch-resistance. This transparent plastic product of the invention thus exhibits properties long sought for in the plastic arts, and not hitherto obtained.

The above example illustrates only one specific embodiment of the invention. Numerous variations are within the scope of the invention, certain of which are outlined below. Thus the melamine-formaldehyde may be employed with or without a modifier, such as alkyd resin. Furthermore, any suitable form of alkyd-modified melamine-formaldehyde may be used, such as that known as "Melmac 599—8." A suitable form of alkyd modifier is known as "Rezyl." Any suitable solvents for the melamine-formaldehyde may be utilized in practicing the invention.

The application of the melamine-formaldehyde may be carried out, for example, by roll-coating as referred to hereinabove, or by dipping. In carrying out the condensation of the melamine-formaldehyde, any suitable catalysts may be employed, such as phosphoric acid, hydrochloric acid, sulfuric acid, maleic acid, paratoluene sulfonic acid. The conditions under which the condensation reaction is carried out may vary, but ordinarily the reaction may be brought about in from 15 to 60 minutes at temperatures of from 100° to 150° C.

The melamine-formaldehyde coating may be disposed on one or both exterior surfaces of the lamination, and as previously mentioned, the thickness of the coating may vary from about 0.0001 inch to about 0.001 inch.

The invention contemplates the use of any of a number of thermoplastic cellulose derivatives, examples of which, as disclosed previously, are cellulose nitrate, cellulose acetate, cellulose acetate propionate, cellulose acetate butyrate, and ethyl cellulose. The cellulose derivative body portion may be in the form of one or more laminae, and several cellulose derivatives may be employed in combination, that is to say, a plurality of laminae, each of a different cellulose derivative, may be associated in the laminated product. The minimum thickness of the cellulose derivative body portion is about 0.005 inch, and there is no upper limit as to its thickness.

Where cellulose acetate butyrate is the cellulose derivative employed, a subcoating or interlayer of cellulose nitrate desirably is interposed between the cellulose acetate butyrate and the melamine-formaldehyde to secure them adhesively together. In the case of other cellulose derivatives, the cellulose nitrate interlayer may be utilized if desired. Where employed, the cellulose nitrate interlayer conveniently may have a thickness of about 0.001 to 0.003 millimeter, and optionally may be of considerably greater thickness.

Where a polarizing sheet such as specifically disclosed herein is to be incorporated in the lamination, any suitable adhesive may be employed to secure the sheet to other laminae. Various suitable adhesives for this purpose are disclosed in the Land Patent 2,237,567, which has been referred to previously. Morever, it will be understood that polarizing sheets other than that specifically disclosed herein may be utilized for the purposes of the invention. Furthermore, the invention may of course be carried out without utilizing any polarizing sheet whatever.

In the illustrative example hereinbefore given, there has been disclosed the use of plate-glass sheets in the press-polishing operation. Such plate-glass sheets of course have plane surfaces. It should be noted that the press-polishing operation may be carried out between curved surfaces, as well as between the plane surfaces hereinbefore mentioned. Furthermore, the press-polishing operation may be carried out between sheets or platens of any suitable material. Thus, in certain instances, press-polishing sheets of metal may be adequate for the purpose at hand. The press-polishing operation may be accomplished within a substantial range of temperatures and pressures. Thus, temperatures of from about 200° to about 250° F. may be employed, together with pressures of from about 200 pounds per square inch to pressures considerably in excess of 500 pounds per square inch.

Since certain changes may be made in the above product, and different embodiments of the invention could be made without departing from the scope thereof, it is intended that all matter contained in the above description or shown in the accompanying drawing shall be interpreted as illustrative and not in a limiting sense.

What is claimed is:

1. A light-polarizing lamination comprising a light-polarizing film of molecularly oriented polyvinyl alcohol containing a dichroic stain comprising iodine, a thin layer of a thermoplastic cellulose ester of at least 0.005 inch thickness bonded to each face of said polarizing film by an adhesive comprising nitrocellulose and polyvinyl alcohol, and a hard, thin, optically smooth, scratch-resistant film of a completely polymerized melamine-formaldehyde resin bonded to the outer face of each of said thermoplastic cellulose ester layers, each said melamine-formaldehyde resin film being of a thickness less than 0.0005 inch.

2. A light-polarizing lamination as called for in claim 1 in which the thermoplastic cellulose ester is cellulose acetate butyrate.

3. A light-polarizing lamination as called for in claim 2 in which the melamine-formaldehyde film is bonded to the cellulose acetate butyrate by an adhesive comprising cellulose nitrate.

DEXTER P. COOPER, Jr.

REFERENCES CITED

The following references are of record in the file of this patent:

UNITED STATES PATENTS

| Number | Name | Date |
|---|---|---|
| 2,133,110 | Nadeau | Oct. 11, 1938 |
| 2,237,567 | Land | Apr. 8, 1941 |
| 2,263,015 | Seel | Nov. 18, 1941 |
| 2,320,533 | Muskat et al. | June 1, 1943 |
| 2,322,048 | Nadeau | June 15, 1943 |
| 2,331,716 | Nadeau | Oct. 12, 1943 |
| 2,332,047 | Bock et al. | Oct. 19, 1943 |
| 2,394,009 | Pollard | Feb. 5, 1946 |
| 2,397,242 | Chubb, Jr. | Mar. 26, 1946 |
| 2,404,426 | Bechtold et al. | July 23, 1946 |
| 2,431,738 | Drew | Dec. 2, 1947 |